(12) United States Patent
Smith

(10) Patent No.: US 7,646,107 B2
(45) Date of Patent: Jan. 12, 2010

(54) PROGRAMMABLE POWER ADAPTOR

(75) Inventor: Scott Smith, Phoenix, AZ (US)

(73) Assignee: Targus Group Internatnional, Inc., Anaheim, CA (US)

( * ) Notice: Subject to any disclaimer, the term of this patent is extended or adjusted under 35 U.S.C. 154(b) by 811 days.

(21) Appl. No.: 10/953,581

(22) Filed: Sep. 30, 2004

(65) Prior Publication Data

US 2006/0071558 A1    Apr. 6, 2006

(51) Int. Cl.
*H02J 1/00* (2006.01)
*H02J 3/00* (2006.01)

(52) U.S. Cl. .................................................. 307/11

(58) Field of Classification Search .................. 307/66, 307/11, 39, 20, 24; 320/106, 107; 439/955, 439/488, 489, 172
See application file for complete search history.

(56) References Cited

U.S. PATENT DOCUMENTS

| | | | |
|---|---|---|---|
| 5,347,211 A | 9/1994 | Jakubowski | |
| 5,479,331 A | 12/1995 | Lenni | |
| 5,636,110 A | 6/1997 | Lanni | |
| 5,838,554 A | 11/1998 | Lanni | |
| 5,949,213 A | 9/1999 | Lanni | |
| 6,064,177 A | 5/2000 | Dixon | 320/111 |
| 6,091,611 A | 7/2000 | Lanni | |
| 6,137,280 A * | 10/2000 | Ackermann et al. | 323/354 |
| 6,172,884 B1 | 1/2001 | Lanni | |
| 6,266,261 B1 | 7/2001 | Lanni | |
| 6,433,274 B1 | 8/2002 | Doss et al. | 174/50 |
| 6,643,158 B2 | 11/2003 | McDonald et al. | 363/142 |
| 6,650,560 B2 | 11/2003 | MacDonald et al. | 363/142 |
| 6,693,413 B1 | 2/2004 | Lanni | |
| 6,700,808 B2 | 3/2004 | MacDonald et al. | |
| 6,707,284 B2 | 3/2004 | Lanni | |
| 6,751,109 B2 | 6/2004 | Doss et al. | |
| 6,775,163 B2 | 8/2004 | McDonald et al. | |
| 6,791,853 B2 | 9/2004 | Afzal et al. | |
| 6,809,943 B2 | 10/2004 | Lanni | |
| 6,831,848 B2 | 12/2004 | Lanni | |
| 6,836,101 B2 | 12/2004 | Lanni | |

(Continued)

FOREIGN PATENT DOCUMENTS

WO    WO 03/038980 A1    5/2003

(Continued)

OTHER PUBLICATIONS

International Search Report for PCT/US05/35242 filed Sep. 30, 2005, and mailed Jul. 21, 2008, 5 pgs.

(Continued)

*Primary Examiner*—Albert W Paladini
*Assistant Examiner*—Carlos Amaya
(74) *Attorney, Agent, or Firm*—John R. Thompson; Stoel Rives LLP

(57) ABSTRACT

Methods and systems for programmable power adaptors that can be programmed to adapt electrical power for one or more electronic devices. A programmable power adaptor optionally includes a user interface and/or other user input mechanism(s), which allows users to preset voltage requirements for one or more electronic devices. The pre-settings are stored in memory for future use. The programmable power adaptor is optionally configurable for multiple electronic devices, and/or multiple users. The programmable power adaptor optionally informs users of faults, proper device usage, and/or provides database access.

41 Claims, 8 Drawing Sheets

U.S. PATENT DOCUMENTS

| | | | |
|---|---|---|---|
| 6,850,423 B2 | 2/2005 | Lanni | |
| 6,903,950 B2 | 6/2005 | Afzal et al. | |
| 6,920,056 B2 | 7/2005 | MacDonald et al. | |
| 6,922,347 B2 | 7/2005 | Lanni | |
| 6,934,561 B2 * | 8/2005 | Burrus, IV | 455/559 |
| 6,937,490 B2 | 8/2005 | MacDonald et al. | |
| 6,939,150 B1 | 9/2005 | Lanni | |
| 6,976,885 B2 | 12/2005 | Lord | |
| 7,035,126 B1 | 4/2006 | Lanni | |
| 7,072,200 B2 | 7/2006 | Lanni | |
| 7,139,181 B2 | 11/2006 | Afzal et al. | |
| 7,142,423 B2 | 11/2006 | Lanni | |
| 7,145,312 B2 * | 12/2006 | Lanni | 320/114 |
| 7,145,787 B2 | 12/2006 | Lanni | |
| 7,148,659 B2 | 12/2006 | Lanni | |
| 7,153,169 B2 | 12/2006 | Lord | |
| 7,193,398 B2 | 3/2007 | Lanni | |
| 7,193,873 B2 | 3/2007 | Lanni | |
| 7,254,048 B2 | 8/2007 | Lanni | |
| 7,266,003 B2 | 9/2007 | Lanni | |
| 7,279,868 B2 | 10/2007 | Lanni | |
| 7,352,158 B2 | 4/2008 | Remson | |
| 7,355,851 B2 | 4/2008 | Lanni | |
| 7,365,524 B2 | 4/2008 | Lanni | |
| 7,365,973 B2 | 4/2008 | Rasmussen et al. | |
| 7,377,805 B2 | 5/2008 | Kim et al. | |
| 7,388,305 B2 | 6/2008 | McCoy et al. | |
| 7,420,823 B2 | 9/2008 | Lanni | |
| 7,450,390 B2 | 11/2008 | Lanni | |
| 7,450,403 B2 | 11/2008 | Lanni | |
| 7,453,171 B2 | 11/2008 | Lanni | |
| 7,456,714 B2 | 11/2008 | McCoy et al. | |
| 7,460,381 B2 | 12/2008 | Lanni | |
| 2003/0119442 A1 * | 6/2003 | Kwak et al. | 455/3.05 |
| 2005/0021870 A1 | 1/2005 | Carnahan et al. | |
| 2005/0117376 A1 | 6/2005 | Wilson | |
| 2005/0141252 A1 | 6/2005 | Mollo | |
| 2006/0007715 A1 | 1/2006 | MacDonald et al. | |
| 2006/0020557 A1 | 1/2006 | Nixon | |
| 2006/0202557 A1 * | 9/2006 | Menas et al. | 307/11 |
| 2006/0279139 A1 | 12/2006 | Stefancscu | |
| 2007/0035287 A1 | 2/2007 | DuBose et al. | |
| 2007/0055791 A1 | 3/2007 | Wood et al. | |
| 2007/0099519 A1 | 5/2007 | Lord | |
| 2007/0171593 A1 | 7/2007 | DuBose | |
| 2007/0175655 A1 | 8/2007 | Swanson et al. | |
| 2008/0012427 A1 | 1/2008 | Wilson et al. | |
| 2008/0231233 A1 | 9/2008 | Thornton | |
| 2009/0021189 A1 | 1/2009 | DuBose et al. | |

FOREIGN PATENT DOCUMENTS

| | | | |
|---|---|---|---|
| WO | WO 2004/082110 A2 | 9/2004 | |
| WO | WO 2004/082110 A3 | 9/2004 | |

OTHER PUBLICATIONS

Written Opinion of the International Search Authority for PCT/US05/35242 filed Sep. 30, 2005, and mailed Jul. 21, 2008, 9 pgs.

\* cited by examiner

PROGRAMMABLE POWER ADAPTOR

BACKGROUND OF THE INVENTION

1. Field of the Invention

The invention relates to power adaptors and, more particularly, to programmable power adaptors.

2. Related Art

Power adaptors are used to provide electrical power to, and/or charge batteries for, a variety of portable electronic devices, such as computers, mobile telephones, handheld personal digital assistants ("PDAs"), smartphones, MP3 players, DVD players, and the like.

Different portable electronic devices often have different electrical requirements. Different portable electronic devices also typically have physically distinct electrical input ports. As a result, conventional power adaptors are generally designed for particular electronic devices. Although some conventional power adaptors are designed to be interchangeable with multiple electronic devices, conventional power adaptors lack programmability and configurability. Thus, what is needed is a programmable power adaptor.

SUMMARY OF THE INVENTION

The present invention is directed to methods and systems for programmable power adaptors that can be programmed to adapt electrical power for one or more electronic devices. A programmable power adaptor optionally includes a user interface and/or other user input mechanism(s), which allows users to preset voltage requirements for one or more electronic devices. The pre-settings are stored in memory for future use. The programmable power adaptor is optionally configurable for multiple electronic devices, and/or multiple users. The programmable power adaptor optionally informs users of faults, proper device usage, and/or provides database access.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

FIG. 1 is a block diagram of an example programmable power adaptor 100.

FIG. 2 is an example screen display 200 for a user interface 108 for the programmable power adaptor 100.

DETAILED DESCRIPTION OF THE INVENTION

I. Programmable Power Adapting

Figure 1:
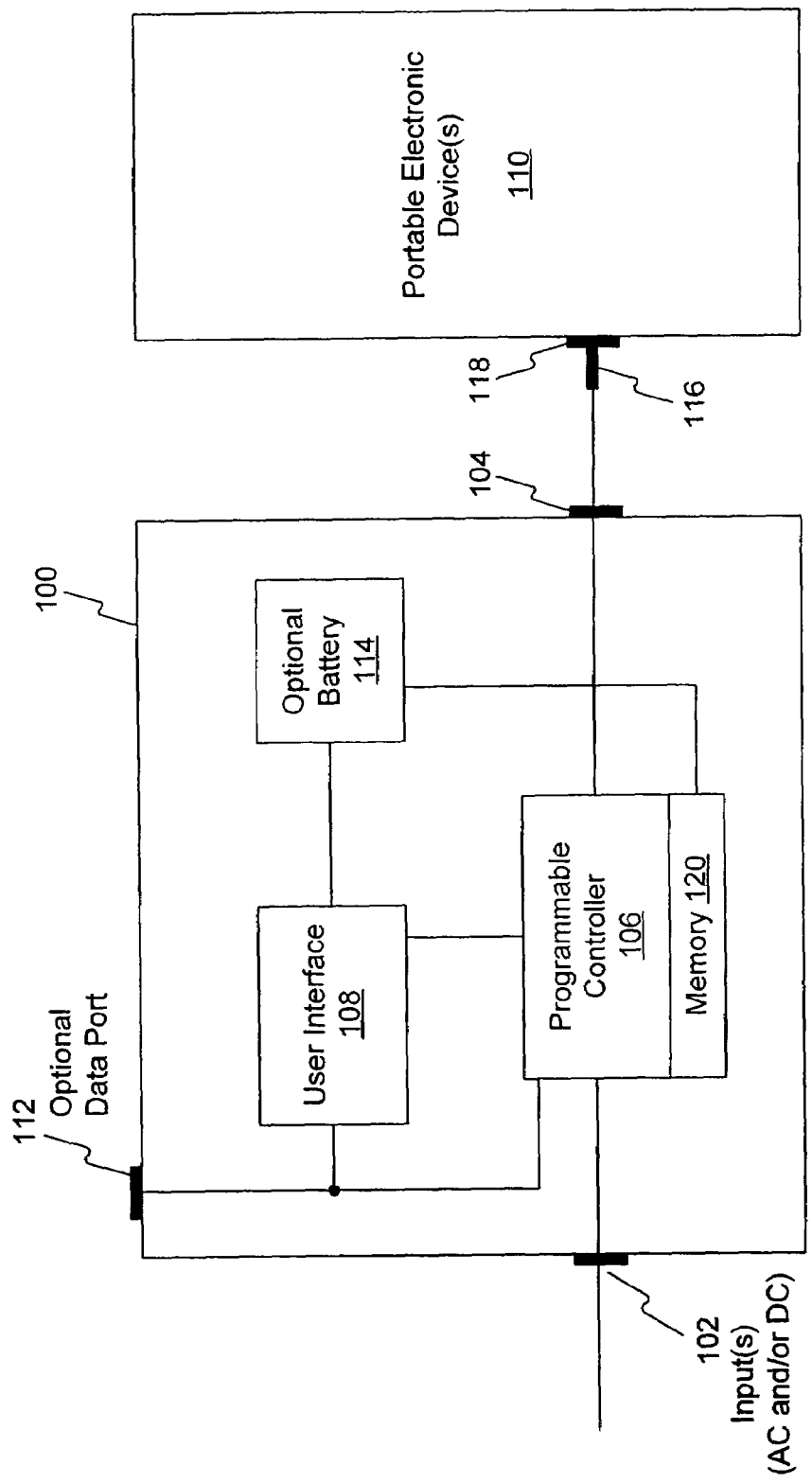

FIG. 1 is a block diagram of an example programmable power adaptor 100. The programmable power adaptor 100 includes an input port 102, for receiving electrical power from an electrical source, such as an electrical wall outlet or an automobile electrical outlet. The electrical source can be an alternating current ("AC") electrical source and/or a direct current ("DC") electrical source.

The programmable power adaptor 100 further includes one or more output ports 104, which provide electrical power (typically DC) to one or more portable electronic devices 110.

The portable electronic devices 110 can be one or more of a variety of types of portable electronic devices. For example, and without limitation, the portable electronic devices 110 can include computers, mobile telephones, handheld personal digital assistants ("PDAs"), smartphones, MP3 players, and DVD players.

Different portable electronic devices 110 often have physically different electrical input ports 118. The programmable power adaptor 100 thus optionally includes one or more interchangeable tips 116 that are removably coupled to the one or more output ports 104, or removably coupled to one or more cables that extend from the one or more output ports 104. The interchangeable tips 116 allow the programmable power adaptor 100 to be coupled to one or more of a variety of different portable devices 110.

During a configuration mode, a user associates a selected portable device 110 with a corresponding set of power supply characteristics. In an embodiment, the association is made by selecting a tip 116 that fits into the input port 118 of the portable device 110, and by fixing the tip to the output port 104. The selected tip is then associated in memory with electrical supply characteristics of the electronic device 110. This is referred to hereinafter as device configuration information. Device configuration information is optionally stored in a database and/or in one or more look-up tables.

During the configuration mode, the programmable power adaptor 100 identifies the installed tip 116 in one or more of a variety of ways. For example, the programmable power adaptor 100 optionally senses one or more characteristics of the installed tip 116, and/or receives feedback information from the installed tip 116. Alternatively, or additionally, the user identifies an installed tip 116 through the user interface 108.

During the configuration mode, the user can provide a variety of types of information to the programmable power adaptor 100. For example, and without limitation, the user identifies the portable device 110 by manufacturer, make, and/or model number. The programmable controller 106 obtains the power requirements for the portable device 110 automatically and/or through manual user input. For example, and without limitation, the programmable power adaptor 100 retrieves the power requirements for the portable device 110 from a look-up table or from a database, which can be internal or external of the programmable power adaptor 100. As described below, the programmable power adaptor 100 is optionally configured to update the look-up table and/or database through an external port. Alternatively, or additionally, the user manually selects input power characteristics for the portable computer.

During normal operation, when the tip 116 is installed, the programmable power adaptor 100 retrieves the associated electrical supply characteristics from memory and converts power accordingly. As with the configuration mode, the programmable power adaptor 100 identifies the installed tip 116 automatically and/or through user interface 108.

For example, where the portable device 110 is a portable computer, the user selects an appropriate tip 116 for the portable computer, fixes the tip 116 to the output port 104, and, through menu selections presented on the user interface 108, the user provides information to the programmable controller that will allow the programmable controller 110 to associate the selected tip 116 with electrical supply needs of the portable computer.

The programmable power adaptor 100 optionally informs users of faults, proper device usage, and/or provides database access.

In the example of FIG. 1, the programmable power adaptor 100 further includes a programmable controller 106, a user interface 108, and memory 120, which are described below.

II. Programmable Controller

The programmable controller 106 allows users to configure the programmable power adaptor 100 to power one or more of a variety of portable electronic devices 110. The programmable controller 106 is optionally fabricated as an application specific integrated circuit ("ASIC"), which is optionally implemented in planar transformer technology. The programmable controller 106 is optionally fabricated with both memory 120 and power conversion circuitry. Alternatively, memory 120 and/or power conversion circuitry, or portions thereof, are provided with other circuitry.

The programmable controller 106 converts the one or more electrical inputs 102 into one or more of a variety of outputs. For example, and without limitation, the programmable controller 106 is designed to convert a 110 volt AC source to a DC voltage in the range of up to 24 VDC. Alternatively, or additionally, the programmable controller 106 is designed to convert a DC source, such as 12 volt DC source (e.g., from an automobile), to one or more of the output DC voltages above. The invention is not, however, limited to the example voltages above. Based on the description herein, one skilled in the relevant art(s) will understand that invention can be designed for other voltages.

III. User Interface

The programmable power adaptor 100 is configured, at least in part, by user commands entered through the user interface 108. The user interface 108 is optionally a graphical user interface ("GUI"), such as a liquid crystal display ("LCD"). FIGS. 2-5, which are described below, are example graphical user interface displays for the user interface 108. Configuration and operation of the programmable power adaptor 100 is described below with reference to FIGS. 2-5. The invention is not, however, limited to the examples of FIGS. 2-5. Based on the description herein, one skilled in the relevant art(s) will understand that the invention can be implemented with other user interfaces.

IV. Configuration

During a configuration mode, a user configures the programmable power adaptor 100 by identifying a desired portable electronic device for configuration.

Figure 2:
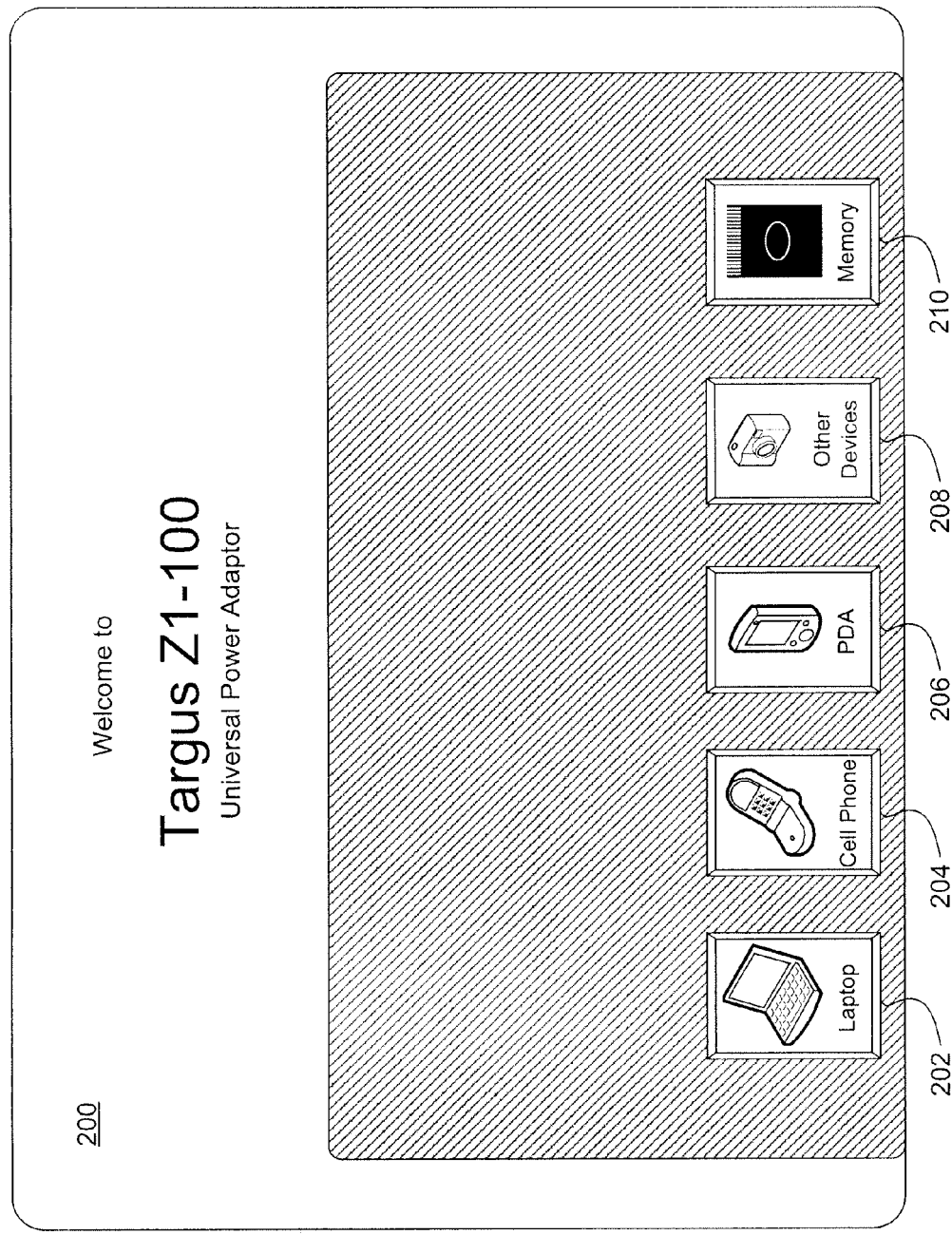

FIG. 2 is an example display 200 for the user interface 108. The display 200 includes selectable icons for a plurality of device types. In the example of FIG. 2, the example icons include a Laptop icon 202, a Cell Phone icon 204, a PDA icon 206, and an "Other Devices" icon 208. The user can select from any of these categories to configure a desired component. The example display 200 also includes a selectable memory icon 210, which is described below.

The icons are activated or selected in one or more of a variety of ways. For example, where the user interface 108 includes a touch screen, icons are selected by touching the screen over a desired icon, by finger and/or by wand. Alternatively, or additionally, icons are selected by way of left and right and/or up and down arrow keys.

When the user selects a desired category from display 200, one or more subsequent display screens and/or pop-up screens are presented to allow the user to select a particular device within the desired category.

Figure 3:
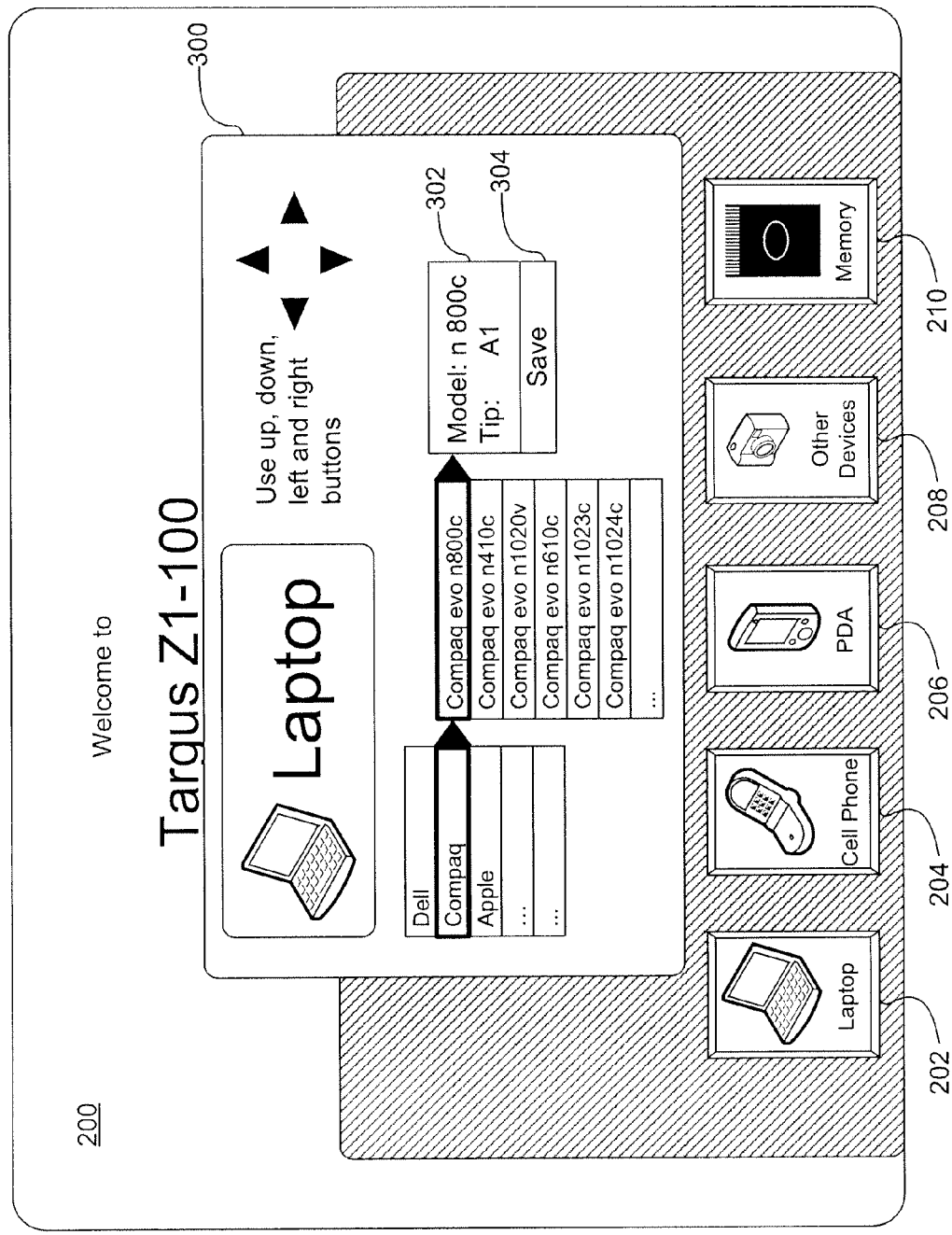
FIG. 3 is an example pop-up display associated with the example screen display 200.

For example, referring to FIG. 3, when the user selects the Laptop icon 202 from display 200, a pop-up display 300 is presented. Pop-up display 300 provides a list of laptop computers. In an embodiment, when a device is listed within the pop-up window 300, electrical requirements of the device are currently stored within the memory 120. The device is thus referred to as a supported device.

Electrical requirements for devices can be loaded into memory 120 during manufacturing. Alternatively, or additionally, electrical requirements for devices are updated periodically, such as through an internet connection. Alternatively, or additionally, electrical requirements for devices are input manually through the user interface 108.

In the example of FIG. 3, a Compaq Evo n800c laptop computer is highlighted in the pop-up display 300. A box 302 within the pop-up display 300 indicates that a tip A1 is currently coupled to the output port 104 as tip 116 (FIG. 1). As described above, the programmable power adaptor 100 identifies the installed tip 116 in one or more of a variety of ways. For example, the programmable power adaptor 100 optionally senses one or more characteristics of the installed tip 116, and/or receives feedback information from the installed tip 116. Alternatively, or additionally, the user identifies an installed tip 116, through the user interface 108, as being the desired tip.

When the desired device is highlighted in pop-up display 300, and when the proper tip is indicated in the box 302, the user saves the configuration by selecting the "save" box 304. The configuration is then saved in memory 120 for future use.

The programmable power adaptor 100 is optionally configurable for multiple devices and/or for multiple users.

Referring back to FIG. 2, users can view information that is currently stored in memory 120 by selecting the memory icon 210.

V. Operation

During normal operation, the programmable power adaptor 100 provides electrical power to one or more electrical devices 110. The programmable power adaptor 100 adapts the electrical input 102 to one or more electrical devices 110, based on each devices' characteristics. The programmable power adaptor 100 optionally senses the presence of one or more installed tips 116, as described above, and automatically retrieves the electrical requirements that were associated with the tip(s) from memory 120. The programmable power adaptor 100 then converts electrical input power 102 according to the retrieved electrical requirements.

Figure 4:
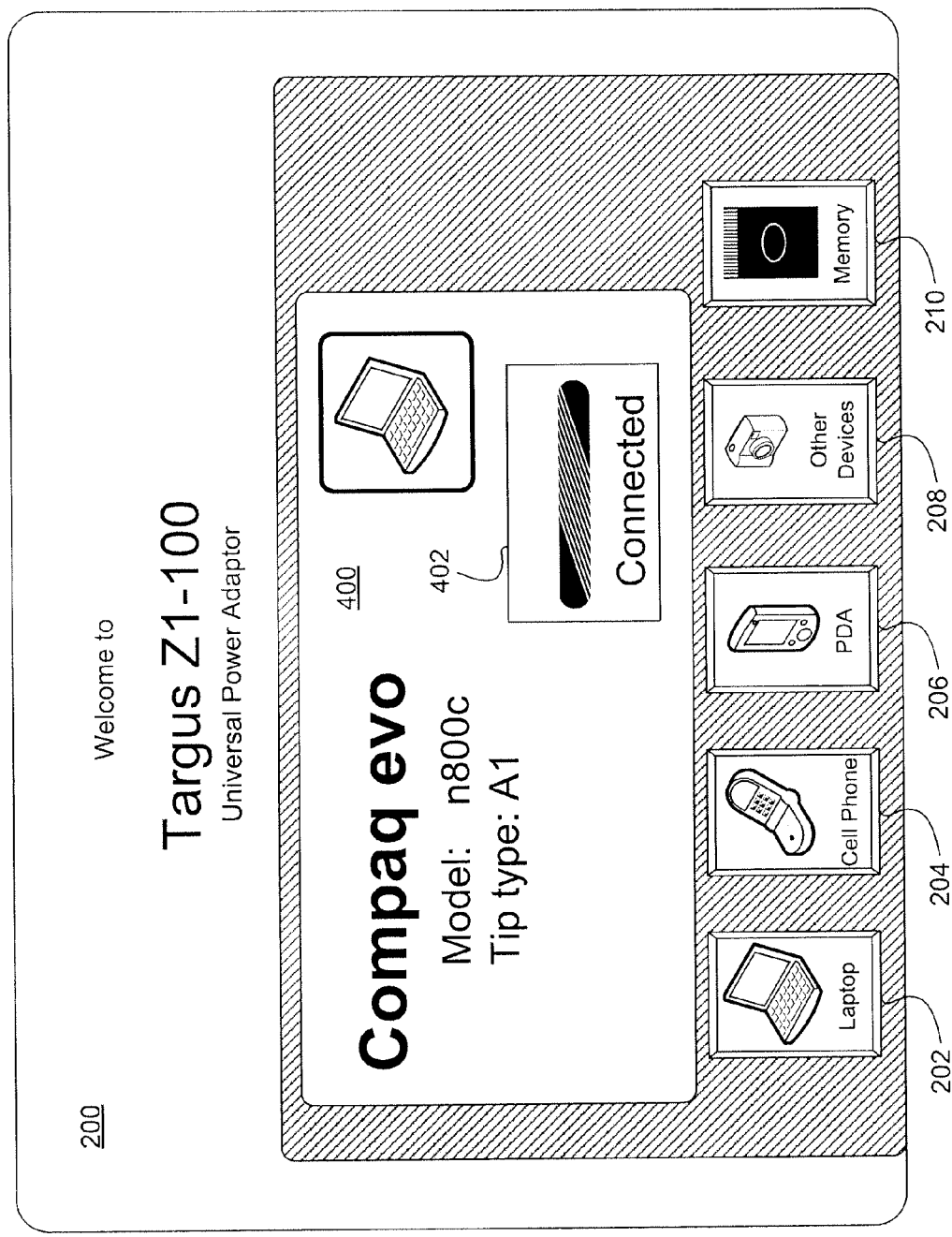
FIG. 4 is another example screen display for the user interface 108.
Figure 5:
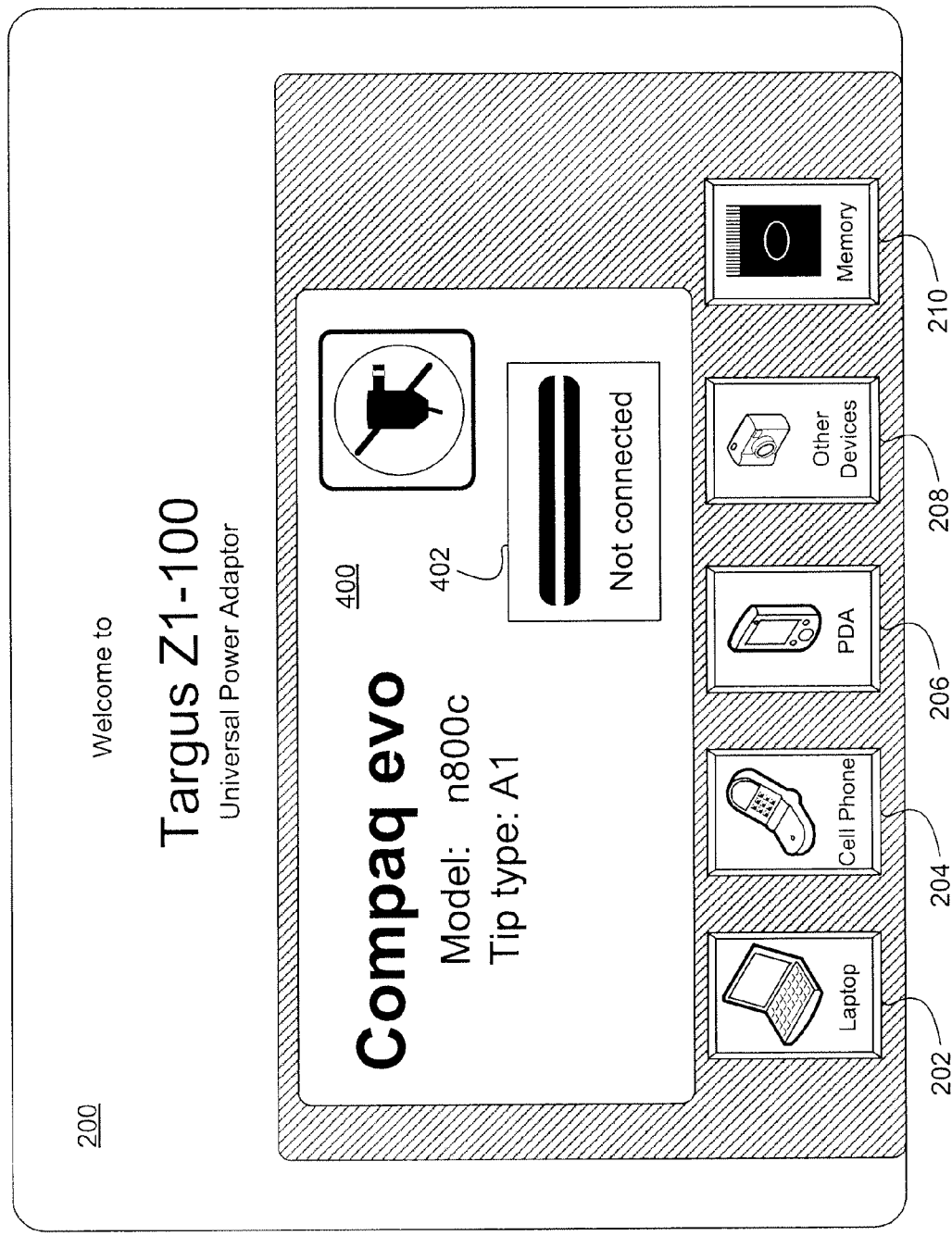
FIG. 5 is another example screen display for the user interface 108.

During normal operation, the programmable power adaptor 100 optionally provides operational information through the display 108. For example, and without limitation, FIGS. 4 and 5 are example screen displays for the user interface 108 during operation. The example screen displays of FIG. 4 and/or FIG. 5 are optionally displayed during normal operation, while a tip A1 is coupled to the programmable power adaptor 100.

In the examples of FIGS. 4 and 5, a display box 400 indicates that the tip A1 is associated in memory 120 with a Compaq evo laptop computer, model number n 800c. In FIG. 4, a connection box 402 indicates that the tip A1 is coupled to the laptop computer. In FIG. 5, the connection box 402 indicates that the tip A1 is not coupled to the laptop computer.

Where multiple portable devices 110 are powered by the programmable power adaptor 100 simultaneously, additional corresponding widows are optionally displayed on the user interface 108.

VI. Uploadable Web-Based Database

The programmable power adaptor 100 optionally updates memory 120 (e.g., database and/or look-up tables) by accessing one or more internet sites or other external database(s). The internet site(s) are optionally dedicated to users of the programmable power adaptor 100. Alternatively, or additionally, the internet site(s) are associated with one or more manufacturers of the portable device(s) 110.

Accordingly, referring back to FIG. 1, the programmable power adaptor 100 optionally includes a data port 112, coupled to the programmable controller 106 and/or to the user interface 108. The optional data port 112 can be coupled to an internet service provider. The data port 112 can be, for example, a mini universal serial bus ("USB") port that allows the programmable power adaptor 100 to couple to a computer that is coupled to the internet. Alternativley, and/or additionally, the data port 112 is a wireless port that allows the programmable power adaptor 100 to couple wirelessly to the internet. The invention is not, however, limited to USB or wireless ports. Based on the description herein, one skilled in the relevant art(s) will understand that a variety of types of connections are contemplated.

VII. Battery

The programmable power adaptor 100 optionally includes an integral and/or externally mounted battery system 114 that, when charged, provides at least temporary back-up power for the user interface 108 and memory 120, thus allowing active interface activity without input power at input terminal 102. The optional battery 114 is charged during normal operation of the programmable power adaptor 100.

The battery 114 is optionally designed to temporarily provide electrical power to portable electronic device(s) 110 to allow a controlled power down of the portable electronic device(s) 110.

VIII. Example Design Packages

Figure 6:
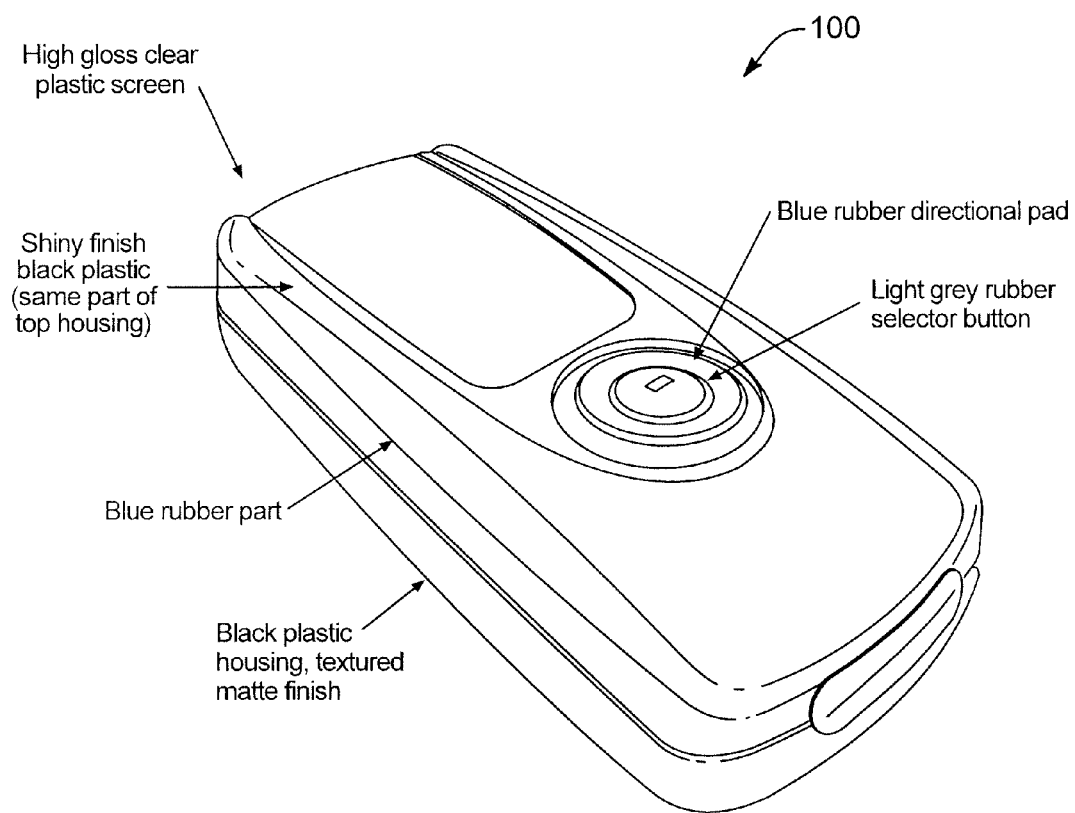
FIG. 6 is a front plan view of an example external package design for the programmable power adaptor 100.
Figure 7:
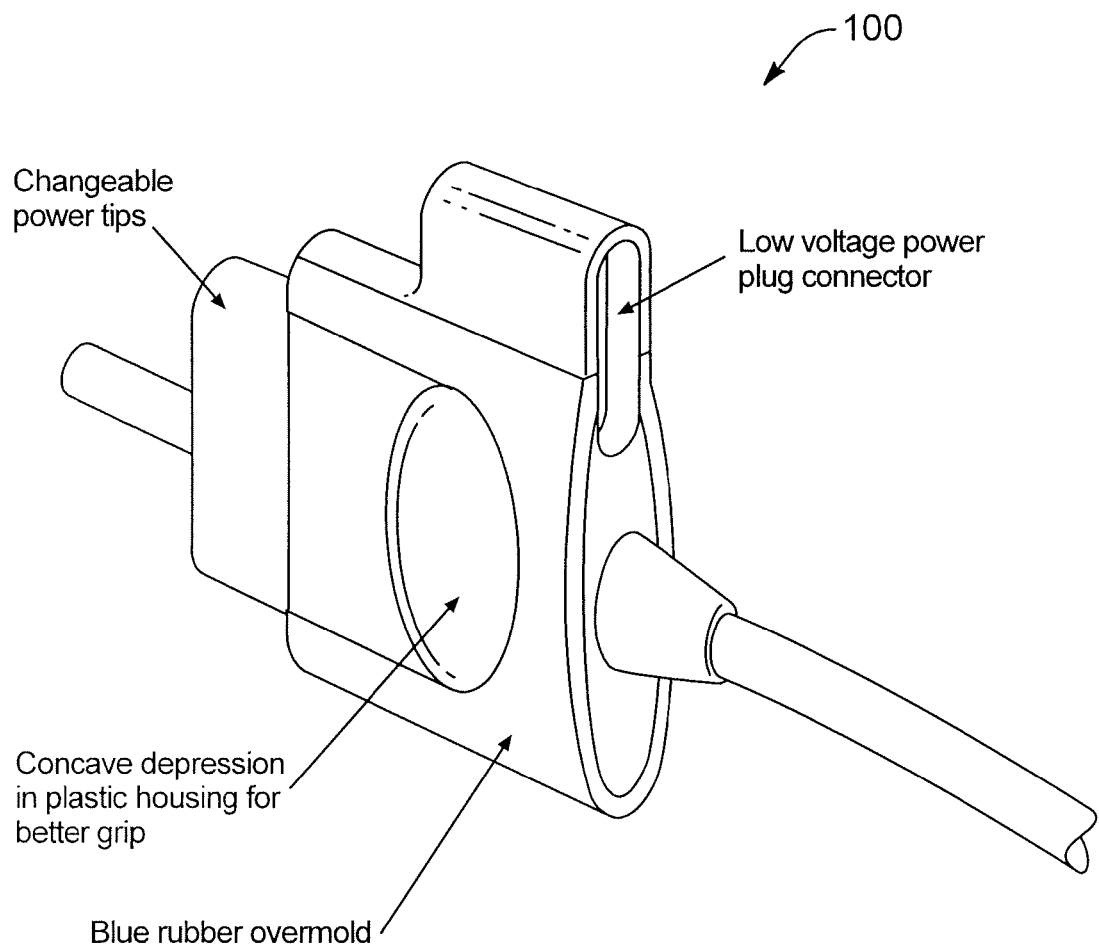
FIG. 7 is a rear plan view of another example external package design for the programmable power adaptor 100.
Figure 8:
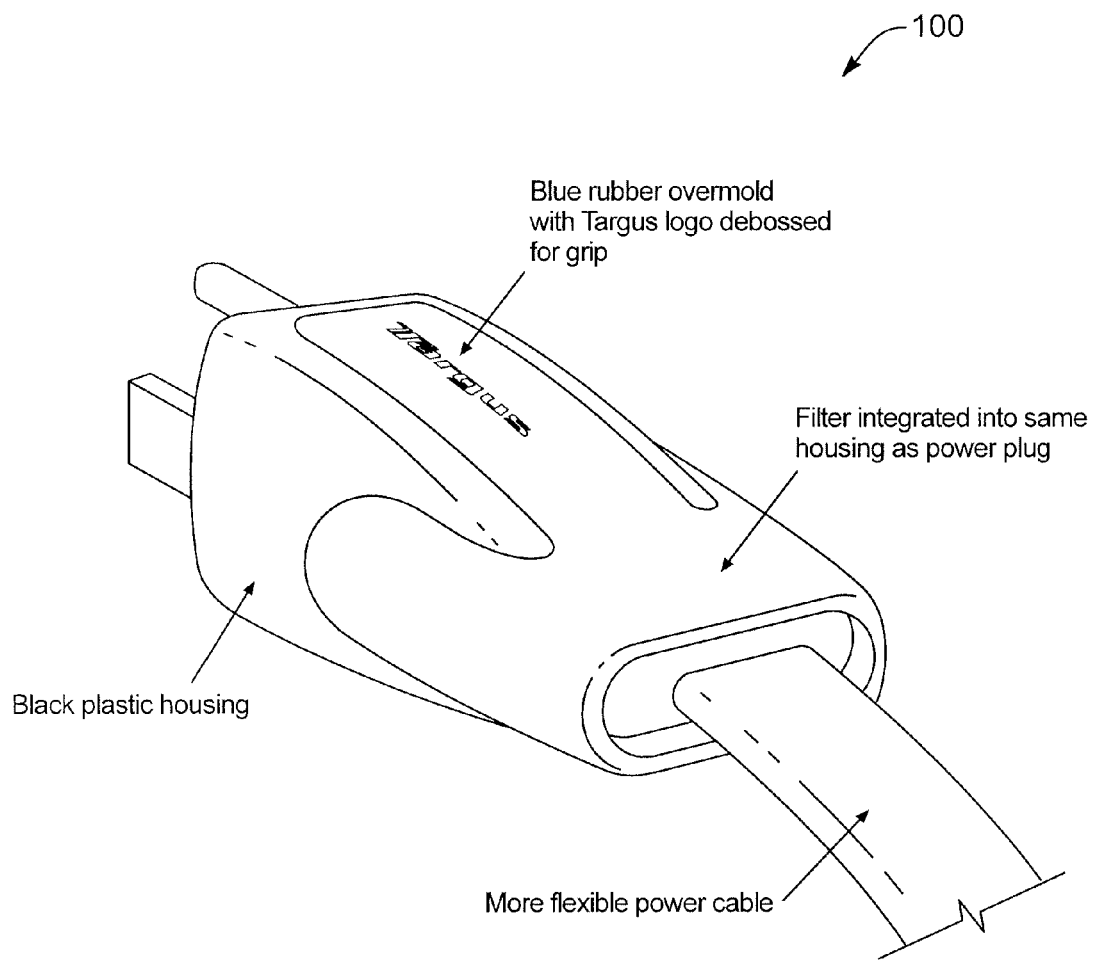
FIG. 8 is another rear plan view of another example external package design for the programmable power adaptor 100.

The programmable power adaptor 100 can be implemented in one or more of a variety of packages. FIG. 6 is a front plan view of an example external package design for the programmable power adaptor 100. FIG. 7 is a rear plan view of another example external package design for the programmable power adaptor 100. FIG. 8 is another rear plan view of another external package design for the programmable power adaptor 100. The invention is not, however, limited to the example design packages illustrated in FIGS. 6, 7, and 8. Based on the description herein, one skilled in the relevant art(s) will understand that the programmable power adaptor 100 can be implemented in other design packages.

IX. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A programmable power adaptor, comprising:
    an electrical input port;
    an electrical output port;
    a cable comprising a first end coupled to the electrical output port, and a second end comprising a connector;
    a plurality of interchangeable connector tips each having a respective type and physical characteristic indicative of said type, the plurality connector of tips selectively attachable to the connector of the second end;
    a memory comprising configuration information to associate an electronic device with a respective power requirement and connector tip type; and
    a programmable controller coupled to the electrical input port, the electrical output port, and the memory;
    wherein the programmable controller detects an indicator of a physical characteristic of one of the plurality of connector tips selectively attached to the electrical output port to identify the connector tip type and accesses the memory to determine the electrical power requirement associated with the identified connector tip type in the configuration information, and wherein the programmable controller adapts electrical power provided to the electrical output port according to the electrical power requirement.

2. The programmable power adaptor according to claim 1, wherein the configuration information associates one or more of the plurality of connector tips with an electrical power requirement of a respective electronic device.

3. The programmable power adaptor according to claim 1, wherein the memory stores configuration information associated with a plurality of electronic devices.

4. The programmable power adaptor according to claim 3, wherein the memory stores configuration information associated with a plurality of electronic devices for a plurality of users.

5. The programmable power adaptor according to claim 3, further comprising a plurality of electrical output ports, wherein the programmable controller simultaneously adapts electrical power provided to one or more of the plurality of electrical output ports according to a connector tip type attached to the respective output port.

6. The programmable power adaptor according to claim 1, further comprising a battery coupled to the memory, wherein the battery provides back-up power for the memory.

7. The programmable power adaptor according to claim 6, wherein the battery further provides at least temporary back-up power to one or more electronic devices coupled to the electrical output port.

8. A programmable power adapter, comprising:
an electrical input port;
an electrical output port;
a memory;
a user interface communicatively coupled to the memory to allow a user to input configuration information for an electronic device, wherein the configuration information associates the electronic device with a type of connector tip that is selectively connectable to the electrical output port with an electrical power requirement of the electronic device, the memory configured to store the configuration information; and
a programmable controller to detect an indicator of a physical characteristic of a connector tip selectively connected to the electrical output port, to identify the connector tip type using the indicator, and to adapt electrical power provided to the electrical output port according to the electrical power requirement associated with the identified connector tip type and electronic device in the configuration information.

9. The programmable power adaptor according to claim 8, wherein the user interface comprises a touch-sensitive liquid crystal display.

10. The power adaptor according to claim 1, wherein the programmable controller adapts alternating current to direct current.

11. The power adaptor according to claim 10, wherein the programmable controller further adapts a first direct current voltage to a second direct current voltage.

12. The power adaptor according to claim 10, wherein the programmable controller is configured to adapt a variety of alternating current frequencies to a direct current.

13. The power adaptor according to claim 1, wherein the programmable controller is configured to identify the type of connector tip attached to the electrical output port using only the indicator of the physical characteristic of the attached connector tip.

14. The power adaptor according to claim 1, wherein the programmable controller is configured to receive feedback from the attached connector tip, and where the programmable controller is configured to identify the type of connector tip using the indicator and the feedback.

15. The programmable power adapter of claim 1, further comprising a data port communicatively coupled to the memory, wherein the configuration information is updated using the data port.

16. The programmable power adapter of claim 15, wherein the data port comprises a universal serial bus port.

17. The programmable power adapter of claim 15, wherein the data port comprises a wireless communications port.

18. The programmable power adapter of claim 15, wherein the data port comprises a network port.

19. A method for adapting electrical power for an electronic device, comprising:
storing configuration information for a plurality of electronic devices, the configuration information comprising an electrical power requirement and a connector tip type associated with each respective electronic device;
detecting an indicator of a physical characteristic of a connector tip selectively coupled to an output of a power adapter;
receiving feedback from the connector tip;
identifying the connector tip type using the indicator and the feedback; and
adapting power provided to the output according to an electrical power requirement associated with the identified connector tip type in the configuration information.

20. The method according to claim 19, wherein the configuration information comprises configuration information for a plurality of users.

21. The method according to claim 19, further comprising updating the configuration information.

22. The method according to claim 21, wherein updating the configuration information comprises receiving updated configuration information from an external device via a data port.

23. The method according to claim 22, wherein the data port comprises one selected from the group consisting of: a universal serial bus data port, a wireless communications data port, and a network data port.

24. The method according to claim 19, wherein adapting power provided to the output comprises converting an alternating current electrical source to a direct current.

25. The method according to claim 19, further comprising receiving a user input identifying an electronic device and associating the electronic device with a connector tip in the configuration information.

26. A computer-readable storage medium comprising instructions to cause a power adapter to perform a method of providing power to an electronic device, the method comprising:
storing configuration information for a plurality of electronic devices, the configuration information comprising an electrical power requirement and a connector tip type associated with each of the plurality of electronic devices;
detecting an indicator of a physical characteristic of a connector tip selectively coupled to an output of the power adapter;
receiving feedback from the connector tip;
identifying the connector tip type using the indicator and the feedback;
accessing the configuration information to determine a power requirement associated with the identified connector tip type; and
adapting electrical power provided to the power outlet according to the electrical power requirement associated with the detected connector tip type in the configuration information.

27. The programmable power adaptor according to claim 8, wherein the user interface comprises a liquid crystal display.

28. The programmable power adapter of claim 8, wherein the user interface is communicatively coupled to an electronic device database comprising respective electrical power requirements and associated connector tip types of a plurality of electronic devices.

29. The programmable power adapter of claim 28, wherein the user interface allows a user to input configuration information by selecting one of the plurality of electronic devices in the electronic device database.

30. The programmable power adapter of claim 29, wherein the electronic device database is stored in the memory.

31. The programmable power adapter of claim 29, further comprising a data port communicatively coupled to the memory.

32. The programmable power adapter of claim 31, wherein the electronic device database is updated using the data port.

33. The programmable power adapter of claim 31, wherein the data port comprises a universal serial bus port.

34. The programmable power adapter of claim 31, wherein the data port comprises a network port.

35. The programmable power adapter of claim 31, wherein the data port comprises a wireless communications port.

36. The programmable power adapter of claim 28, wherein the electronic device configuration information is associated with a user of the programmable power adapter.

37. The programmable power adapter of claim 36, wherein the memory comprises electronic device configuration information for a plurality of users.

38. The programmable power adapter of claim 37, wherein the user interface allows for selection of one of the plurality of users, and wherein upon selecting one of the plurality of users, the user interface is configured to display the configuration information associated with the selected user.

39. The programmable power adapter of claim 37, wherein the user interface allows for selection of one of the plurality of users, and wherein upon selecting one of the plurality of users, the programmable controller is configured to adapt power provided to the electrical output port according to the configuration information associated with the selected user.

40. The programmable power adapter of claim 8, wherein the user interface is configured to display an identifier of an electronic device upon detecting attachment of a connector tip of the type associated with the electronic device in the configuration information.

41. The programmable power adapter of claim 40, wherein the user interface is configured to display a connectivity status of the electronic device.

* * * * *

UNITED STATES PATENT AND TRADEMARK OFFICE
CERTIFICATE OF CORRECTION

PATENT NO.       : 7,646,107 B2                    Page 1 of 1
APPLICATION NO. : 10/953581
DATED            : January 12, 2010
INVENTOR(S)      : Scott Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Sixteenth Day of November, 2010

David J. Kappos
*Director of the United States Patent and Trademark Office*